US009625562B2

(12) United States Patent
Holte

(10) Patent No.: US 9,625,562 B2
(45) Date of Patent: Apr. 18, 2017

(54) METHOD FOR DETERMINING A DIRECTION TO A SIGNAL-EMITTING OBJECT

(75) Inventor: Sven Holte, Jaerfaella (SE)

(73) Assignee: SAAB AB, Linkoeping (SE)

(*) Notice: Subject to any disclaimer, the term of this patent is extended or adjusted under 35 U.S.C. 154(b) by 0 days.

(21) Appl. No.: 14/405,669

(22) PCT Filed: Jul. 3, 2012

(86) PCT No.: PCT/SE2012/000103
§ 371 (c)(1),
(2), (4) Date: Feb. 2, 2015

(87) PCT Pub. No.: WO2014/007686
PCT Pub. Date: Jan. 9, 2014

(65) Prior Publication Data
US 2015/0168534 A1    Jun. 18, 2015

(51) Int. Cl.
*G01S 3/48*    (2006.01)
*G01S 5/04*    (2006.01)
(Continued)

(52) U.S. Cl.
CPC    *G01S 3/48* (2013.01); *G01S 5/04* (2013.01); *G01S 11/04* (2013.01); *H01Q 1/287* (2013.01); *H01Q 21/29* (2013.01); *G01S 5/12* (2013.01)

(58) Field of Classification Search
CPC ... G01S 3/48; G01S 5/04; G01S 13/06; G01S 2013/0245; G01S 2013/0254;
(Continued)

(56) References Cited

U.S. PATENT DOCUMENTS 2,825,900 A * 3/1958 Collbohm ............ H01Q 3/2635
342/380
4,328,499 A 5/1982 Anderson et al.
(Continued)

OTHER PUBLICATIONS

International Searching Authority, International Search Report and Written Opinion for International Application No. PCT/SE2012/000103, Apr. 18, 2013, 8 pages, Swedish Patent and Registration Office, Stockholm.
(Continued)

*Primary Examiner* — Bernarr Gregory
*Assistant Examiner* — Fred H Mull
(74) *Attorney, Agent, or Firm* — Alson & Bird LLP

(57) ABSTRACT

The present invention relates to a method for determining a direction to a signal-emitting object by means of a platform comprising at least two antennas separated by a known distance. The method comprises said steps of: receiving, with each of said at least two antennas, a signal from said signal-emitting object at first positions, determining a first phase relation of said signal between said at least two antennas, —receiving, with each of said at least two antennas, a signal from said signal-emitting object at at least second positions, determining at least a second phase relation of said signal between said at least two antennas, characterized by the steps of: determining change(s) in position(s) of at least one antenna of said at least two antennas, and determining a direction to a signal-emitting object based on said first phase relation, said at least second phase relation and said change(s) in position(s) of said at least one antenna. The invention further relates to a platform performing a determination of a direction to a signal-emitting object.

6 Claims, 3 Drawing Sheets

(51) Int. Cl.
*G01S 5/12* (2006.01)
*G01S 11/04* (2006.01)
*H01Q 1/28* (2006.01)
*H01Q 21/29* (2006.01)

(58) Field of Classification Search
CPC . G01S 2013/0263; G01S 19/17–19/18; H01Q 1/287
See application file for complete search history.

(56) References Cited

U.S. PATENT DOCUMENTS

| | | | | |
|---|---|---|---|---|
| 4,734,702 A | * | 3/1988 | Kaplan | G01S 3/48 342/424 |
| 5,457,466 A | | 10/1995 | Rose | |
| 5,519,403 A | * | 5/1996 | Bickley | G01S 5/0027 342/352 |
| 5,714,964 A | * | 2/1998 | Jackson | H01Q 13/08 343/786 |
| 5,835,060 A | * | 11/1998 | Czarnecki | G01S 5/04 342/424 |
| 5,870,056 A | * | 2/1999 | Fowler | G01S 11/10 342/156 |
| 6,166,677 A | | 12/2000 | Kikuchi et al. | |
| 6,430,498 B1 | * | 8/2002 | Maruyama | G01C 21/26 340/980 |
| 7,579,989 B2 | | 8/2009 | Winterling et al. | |
| 2004/0029558 A1 | * | 2/2004 | Liu | G01S 5/02 455/404.2 |
| 2004/0119640 A1 | | 6/2004 | Menegozzi et al. | |
| 2005/0033507 A1 | * | 2/2005 | Fukui | G01C 21/3632 701/445 |
| 2006/0114157 A1 | | 6/2006 | Kolanek et al. | |
| 2009/0082139 A1 | * | 3/2009 | Hart | A63B 24/0003 473/407 |
| 2011/0260911 A1 | | 10/2011 | Sapp | |

OTHER PUBLICATIONS

Eupopean Patent Office, Extended European Search Report for Application No. 12880585.0, Jan. 15, 2016, 8 pages, Germany.

\* cited by examiner

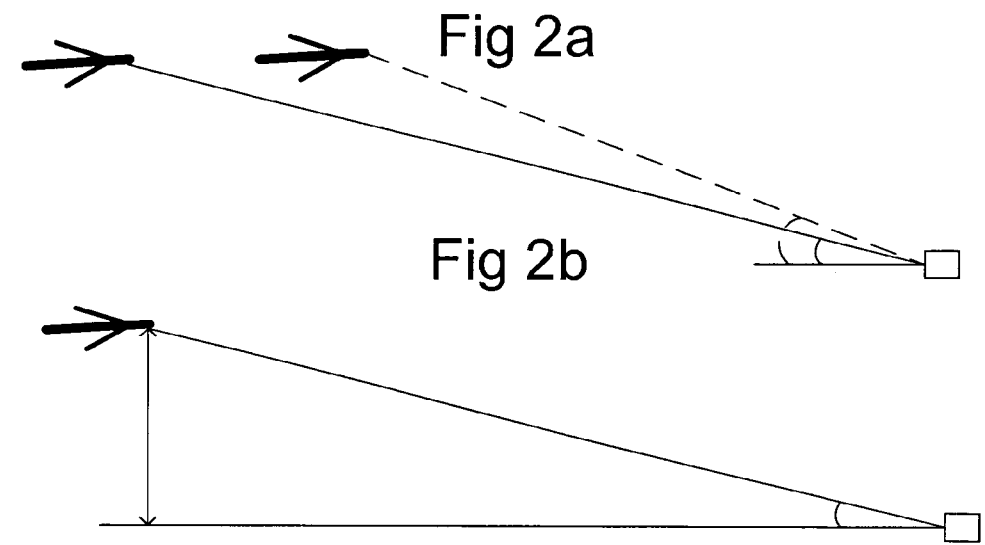
Fig 2a
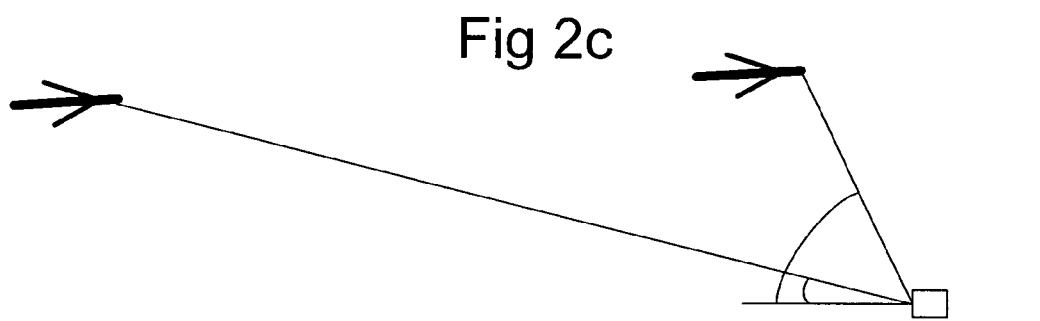
Fig 2b
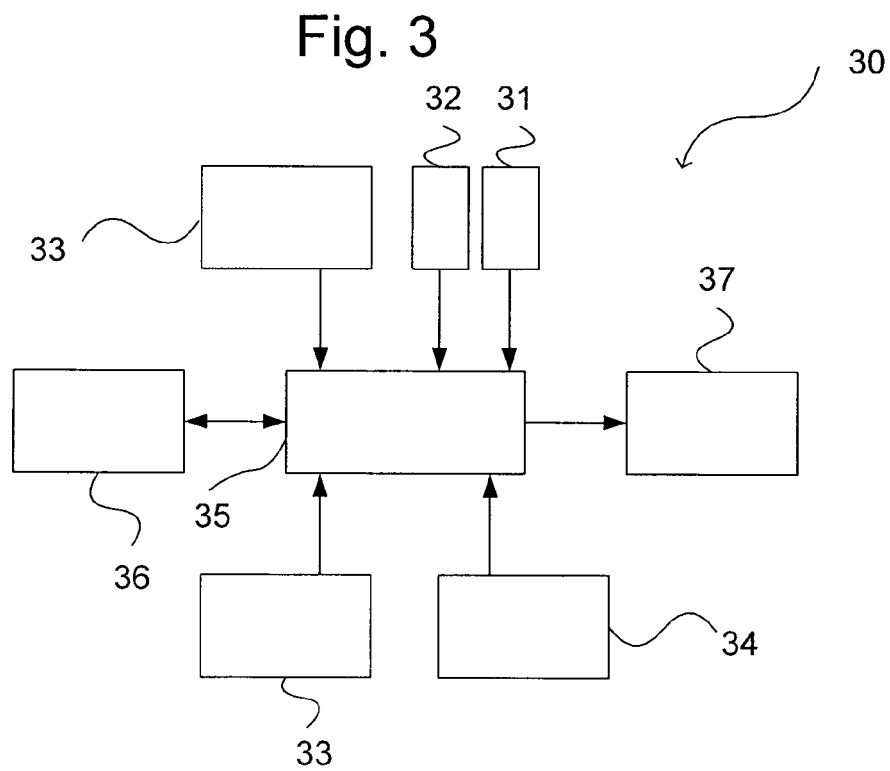
Fig 2c
Fig. 3

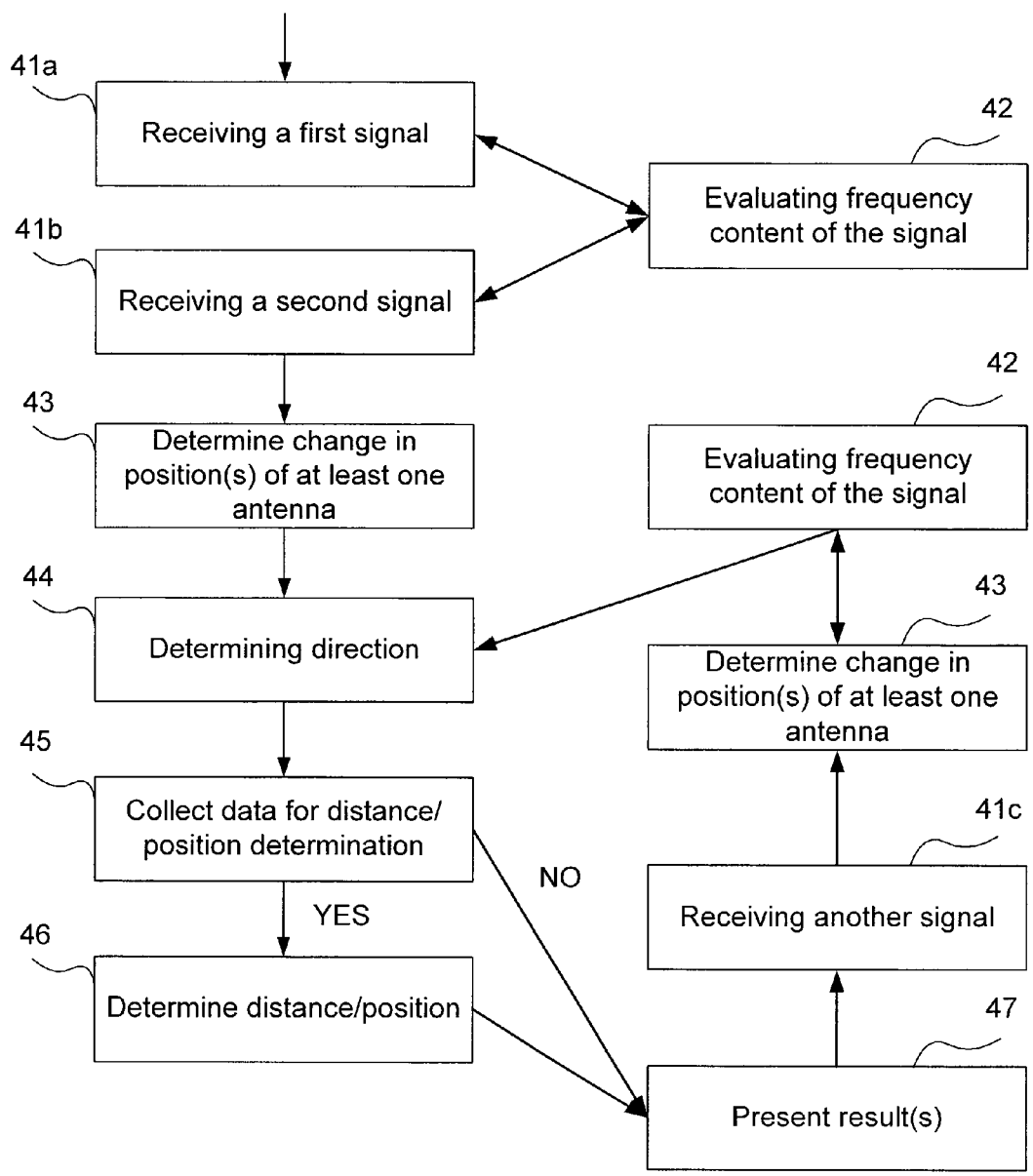

METHOD FOR DETERMINING A DIRECTION TO A SIGNAL-EMITTING OBJECT

CROSS REFERENCE TO RELATED APPLICATIONS

This application is a National Stage Application, filed under 35 U.S.C. §371, of International Application No. PCT/SE2012/000103, filed Jul. 3, 2012, the contents of which as are hereby incorporated by reference in their entirety.

BACKGROUND

Related Field

The present invention relates to direction finding and, more particularly, to correlating signals received from a signal-emitting object using antennas to determine a direction to the signal-emitting object.

Description of Related Art

Radar is an object-detection system which uses radio waves to determine the range, altitude, direction, or speed of objects. It can be used to detect airborne vehicles, ships, spacecraft, guided missiles, motor vehicles and terrain. The radar antenna transmits pulses of radio waves or microwaves which bounce off any object in their path. The object returns a tiny part of the wave's energy to an antenna which is usually located at the same site as the transmitter.

It is also possible to use a passive technique for object detection where the antenna only receives pulses sent from other signal-emitting objects. The antenna is arranged on a platform, such as a vehicle, satellite or similar. An obvious advantage with this method is that no other signal-receiving object can track the position of the platform by means of using the passive technique for object detection. The platform can only be detected by active pulse sending radar technique.

Phase interferometry techniques in their simplest form utilize a pair of antennas disposed on a moving platform spaced apart by a known distance such that a plane wave arriving at an angle relative to the pair is received by one antenna at an earlier point in time than the other, due to the difference in path length traversed by the wave. If the signals from the two antennas are processed, their phase difference provides an indirect measurement of a direction to a signal-emitting object relative to the antenna pair.

A typical radio frequency interferometer system computes a direction to a signal-emitting object by utilizing the phase difference or phase relation of the signal-emitting object signal arriving at individual antennas of an array. The phase measurements of the interferometer can be ambiguous if the baseline, that is the separation between the antennas, is greater than half the wavelength of the received signal.

As the interferometer baseline length increases, thereby increasing the number of ambiguities, the direction measurement accuracy increases. Thus, the desire of a long interferometer baseline, conflicts with the need for robust phase or ambiguity resolution, which is easier to accomplish with a short baseline. In addition, long baselines are difficult to achieve when the receiving apparatus is on an airborne vehicle.

A typical direction finding (DF) interferometer system locates a signal-emitting object by utilizing the phase difference of the signal-emitting object signal arriving at the individual antennas. DF accuracy of such systems is directly related to DF array size which is determined by the spacing between multiple antennas of antenna array of the DF system. Simply increasing interferometric baseline without increasing the number of DF antennas leads to an increased number of ambiguities. Therefore, such prior art DF systems require many antennas and DF receivers and are very costly. The need for more antennas and more DF receivers negatively affects their use on airborne vehicle.

U.S. Pat. No. 5,835,060 entitled "Self-resolving LBI Triangulation" also teaches a long baseline interferometer (LBI) system for determining the position of a signal-emitting object. The system has two antennas and the phase differences between the signals received by the antennas at each end of the long baseline are monitored as the interferometer moves along a measurement path to obtain repetitive phase difference measurements distributed along the measurement path.

As will be appreciated, the number of antenna elements required by airborne DF interferometer systems leaves a limited amount of space for other sensors on the exterior of the airborne vehicle. Thus, it is desirable to provide a DF interferometer system for an airborne vehicle that needs only a few antennas while providing the same or greater accuracy of determining the direction to the signal-emitting object as prior art systems.

BRIEF SUMMARY

It is one object of the present invention to obviate at least some of the above disadvantages and provide improved determination of a direction to a signal-emitting object with only a few antennas.

This has in one example been accomplished by means of a method for determining a direction to a signal-emitting object by means of a platform comprising at least two antennas separated by a known distance. The method comprises the steps of:

receiving, with each of the at least two antennas, a signal from the signal-emitting object at first positions, determining a first phase relation of the signal between the at least two antennas, receiving, with each of the at least two antennas, a signal from the signal-emitting object at at least second positions, determining at least a second phase relation of the signal between the at least two antennas, determining change(s) in position(s) of at least one antenna of the at least two antennas, and determining a direction to a signal-emitting object based on the first phase relation, the at least second phase relation and the change(s) in position(s) of the at least one antenna.

With this method a correlation interferometer is accomplished with only a few antennas by changing the position(s) of at least one antenna and thereby creating a virtual antenna array aperture from which the direction to the signal-emitting object is determined.

The effect is that a virtual antenna array aperture is formed by the change(s) in position(s) of the antenna(s). The determination of the direction to the signal-emitting object is based on the virtual antenna array aperture formed by the changes in positions of the antenna(s). The at least two antennas forms a virtual aperture when rotated from which the direction to the signal-emitting object is determined.

With only two measurements at different antenna positions the direction finding method may present several possible directions to the signal-emitting object. The presented possible directions represents a phase difference plus an integer of 2π. In order to get an accurate result where the direction is determined with less ambiguities, the direction to the signal emitting object is determined based on the first phase relation and a plurality of second phase relations. In one example, in total 5-15 phase relations and associated position changes are used for determining the direction to the signal emitting object.

In one option, new second phase relations and associated positions changes are determined at least until ambiguities have been resolved with desired accuracy. Thereby, it is possible in each given case to set a pre-set value, representing measurements which are "good enough", according to given circumstances.

The determination of the direction to the signal-emitting object is based on the virtual antenna array aperture formed by the change(s) in position(s) of the at least one antenna from which the direction to the signal-emitting object is determined.

According to another aspect of the invention a distance to and possibly also a position of the signal-emitting object is determined. In one option, the distance to and possible also the position of the signal-emitting object is determined based on variations in determined directions to the signal-emitting object over a period of time, wherein the variations in determined directions are a result of a travelling movement in a direction substantially coinciding with a travel direction of the platform. The distance to the signal-emitting object may be determined based on triangulation.

In one option, the distance to and possibly also position of the signal-emitting object determined is based on the direction to the land based signal emitting object and based on the height of the airborne platform.

In one option, the distance to and possibly also position of the signal emitting object is determined based on determined directions from at least two platforms with different geographical positions using a cross bearing technique.

In accordance with one embodiment the invention also relates to a platform comprising at least two antennas separated by a known distance, and a processing unit arranged to determine a direction to a signal-emitting object based on signal(s) received with the at least two antennas. The processing unit is arranged to determine a first phase relation of a signal between the at least two antennas at first positions, and at least a second phase relation of signal(s) between the at least two antennas. The processing unit further is arranged to determine change(s) in position(s) of at least one antenna and determine the direction to the signal-emitting object based on the first phase relation, the at least second phase relation and the change(s) in position(s) of the at least one antenna.

According to another aspect the at least two antennas are mounted on the platform, and wherein said change(s) in position(s) of said at least one antenna is determined based on a change in orientation of the platform.

An advantage of this is that the change(s) in position(s) of the at least one antenna is accomplished by a change in orientation of the whole platform. Another advantage is that it is easier to keep track of the positions of the antennas.

According to a further aspect of the invention the platform is an airborne vehicle and the change in orientation is a roll or turn of the airborne vehicle. Measurements may be conducted when the airborne vehicle is turning or, in case the airborne vehicle is continuing forward, when the airborne vehicle is rolling.

According to yet a further aspect of the invention the change in orientation is a roll or turn in a plane perpendicular to a travelling movement of the airborne vehicle. The effect of this is that the airborne vehicle may conduct measurements of the direction to the signal-emitting object while performing a turn that would have been done anyway disregarding the signal-emitting object. If the airborne vehicle is aiming to continue forward the measurements may be conducted while rolling the airborne vehicle in order to conduct measurements to determine the direction to the signal-emitting object.

The determination of the direction to the signal-emitting object may be based on a virtual antenna array aperture formed by the change(s) in position(s) of the at least one antenna in a plane perpendicular to a travelling movement of the platform. The effect of this is a large virtual antenna array aperture is formed, based on the distance between the antennas.

The positions of the antennas may be determined using an Inertial Navigation System (INS) of the platform. The effect of this is that the positions of the antennas are determined with high accuracy.

BRIEF DESCRIPTION OF THE FIGURES

The invention will be further described with reference to the accompanying drawings.

FIG. 2a shows schematically a scene from above illustrating the determination of the position of a signal emitting object according to one embodiment.

FIG. 2b shows schematically a side view of a scene illustrating determination of the position of a signal emitting object according to a second embodiment.

FIG. 2c shows schematically a scene from above illustrating the determination of the position of a signal emitting object according to a third embodiment.

FIG. 3 shows a view of the platform including necessary devices.

FIG. 4 shows a view of the method which describes the invention.

DETAILED DESCRIPTION OF VARIOUS EMBODIMENTS

Figure 1:
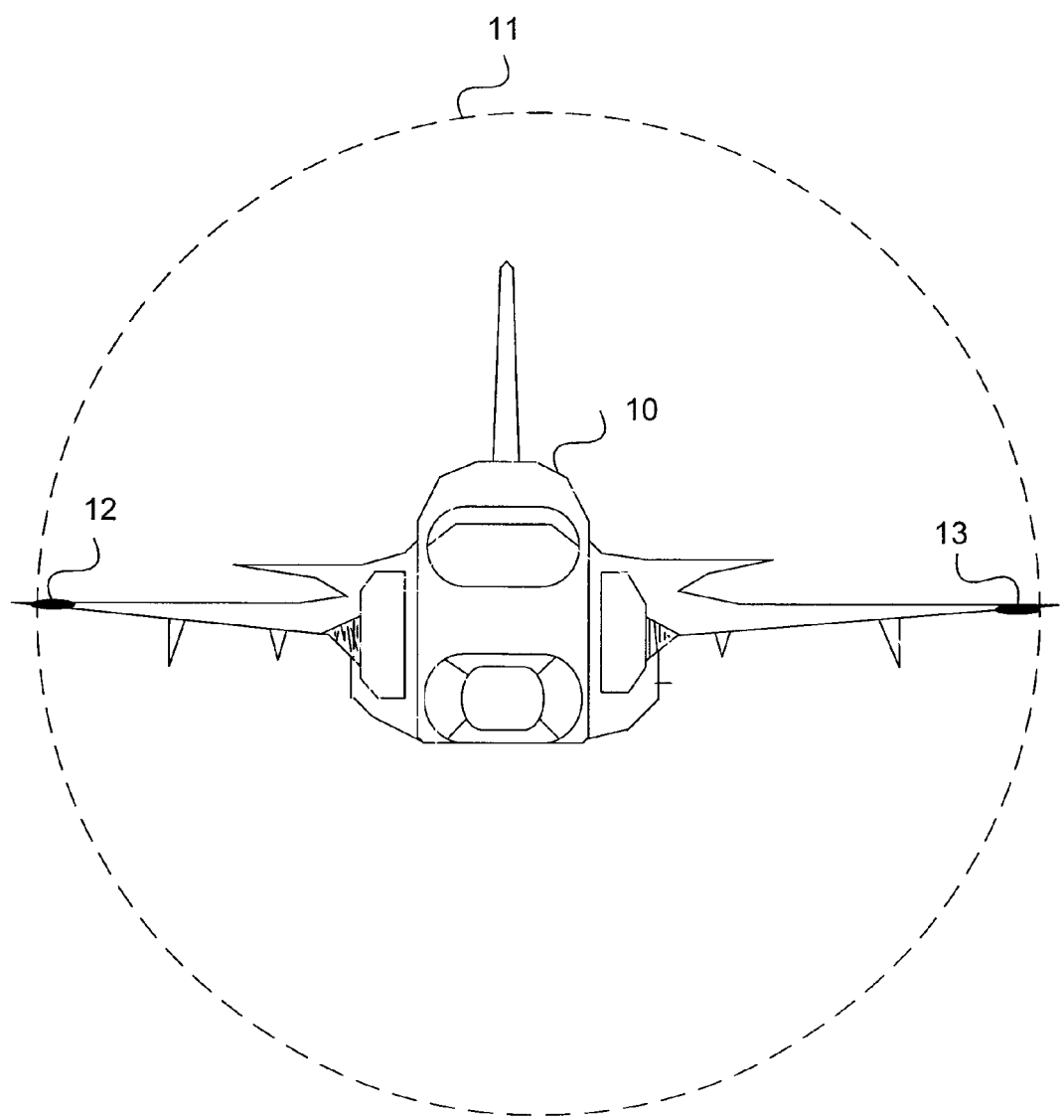
FIG. 1 shows a view of the virtual antenna array aperture formed by a change in position of the platform in a plane perpendicular to the direction of the platform.

The following description describes a platform, such as an airborne vehicle arranged to determine the direction to a signal-emitting object. The platform may also be of a stationary type such as a wind power plant. The terms "platform" and "airborne vehicle" used in this disclosure always refer to the platform determining the direction to a signal-emitting object as described by present invention. The "signal-emitting object" may be itself another vehicle or stationary object. The term "virtual antenna array aperture" used in this disclosure refers to a virtual aperture that is formed by displacement(s) of antenna(s) based from antennas forming a long base interferometer (LBI), arranged on a platform such as an airborne vehicle from which a direction of a signal-emitting object is determined by means of comparing phase relations between points of measurements differing in space. The term "phase relation" refers to a relation between signals received at different points in space. In case of comparing one signal received at only two different points in space, the term is used equal to "phase difference". The phase relation may in one example be calibrated such that the absolute value of the phase relation is known. In another example, the absolute value of the phase relation is not known; however it is constant over a series of measurements.

FIG. 1 shows a view of a virtual antenna array aperture 11 formed by a change in position of a platform 10 in a plane perpendicular to the direction of a platform. A direction to a signal-emitting object is determined based on the virtual antenna array aperture 11 formed by the change(s) in position(s) of at least one antenna 12, 13. The change(s) in position(s) may be determined projected to a plane perpendicular to a travelling movement of the platform from which the direction to the signal-emitting object is determined.

The direction can be determined to a signal-emitting object irrespective of where the signal-emitting object is positioned. Nevertheless, the larger the angle is between a plane of the virtual antenna array aperture and the direction to the signal-emitting object, the larger the projected virtual antenna array aperture is in a direction to the signal-emitting object.

The platform may be an airborne vehicle. The change in position may then be a roll or turn of the airborne vehicle. Measurements are conducted when the airborne vehicle is turning or, in case the airborne vehicle is continuing forward, when the airborne vehicle is rolling. The change in position may be a roll or turn in a direction perpendicular to a travelling movement of the airborne vehicle. The antennas may be mounted on the wings of the airborne vehicle, preferably on the tip of the wings so that a large virtual antenna array aperture is formed.

FIG. 3 illustrates a platform 30, such as an airborne vehicle, comprising a first antenna 31 receiving signals, a second antenna 32 receiving signals and a position determination unit 33. The position determination unit 33 uses motion sensors and rotation sensors to continuously calculate for example position, orientation, direction and/or speed of movement of the platform without the need for external references. The position determination unit 33 may comprise an Inertial Navigation System (INS). In the illustrated example, the platform 30 further comprises a GPS receiver 34 arranged to provide positioning data. The platform 30 further comprises a processing unit 35 arranged to determine a direction to and/or a distance to and/or a position of a signal-emitting object based on inputs from the first antenna 31, the second antenna 32, the position determination unit 33 and the GPS receiver 34. The processing unit 35 is arranged to provide the received signals from the first antenna 31 and the second antenna 32 with timing information and position information. The timing information may be provided from the GPS receiver 34. The position information is determined based on the information from the position determination unit 33 and a known position relation between the position determination unit 33 and the respective antennas 31, 32. The processing unit 35 is arranged to decide whether the received signals are of interest, based on pre-set criteria, for example depending on a frequency or a frequency spectrum of the received signals. In one example, only a main lobe of received signals such as radar signals is of interest. In one example the processing unit 35 compares the received signals with information from a signature library 36, wherein the library comprises the electric signatures of different signal-emitting objects. If the signal(s) are determined to be of interest, the processing unit 35 is arranged to determine a direction to and/or a distance to and/or a position of the signal-emitting object based on a virtual antenna array aperture formed by displacement(s) of at least one of the antennas 31. The direction to and/or the distance to and/or the position of the signal-emitting object is in the illustrated example presented by a display unit 37. In the description above only two antennas 31, 32 have been mentioned. It should be understood that there may be three or more antennas on the platform. The principle of comparing the phase relation would still be the same.

The platform 30 is used to register signals such as radar waves sent from other platforms. The signals can be sent in pulses or continuously. The signals that the antennas are able to receive may be radio waves, such as radar waves, for example in an interval between 100 MHz and 100 GHz. The receiving antennas may have wide beams for wide coverage or narrow beams in order to improve sensitivity. The antennas in the invention might be only used for receiving signals and not transmitting signals.

FIG. 4 illustrates a method for determining a direction to a signal-emitting object. The method may be implemented in a processing unit 35 of a platform. A first signal 41a at the at least two antennas 31, 32 is received at first position(s). The processing unit 35 evaluates 42, for example based on frequency content, if the received first signal 41a is of interest. The signal from at least one antenna may be used in this evaluation. If the received first signal 41a is not of interest, the information of the received first signal 41a is discarded and the processing unit 35 waits for a new first signal. If the received first signal 41a is of interest, the platform may be instructed to change the positions of the antennas 31, 32. When the first signal has been determined to be of interest at least a second signal 41b at the at least two antennas 31, 32 is received at at least second position(s). The processing unit 35 determines a direction 44 to the signal-emitting object based first phase relation, the second phase relation and the change(s) in position of the at least one antenna. Thereafter the result 47 of the determined direction may be presented by means of the display unit 37.

For providing accurate result where the direction is determined with small or no ambiguities, the direction to the signal emitting object is determined based on the first phase relation and a plurality of second phase relations. In one example, in total 5-15 phase relations and associated position changes are used for determining the direction to the signal emitting object. In the method, new second phase relations and associated positions changes may be determined at least until ambiguities have been resolved with desired accuracy. Thereby, it is possible in each given case to set a pre-set value, representing measurements which are "good enough", according to given circumstances.

In the illustrated example the method further comprises a step for securing that the received signals all relate to the same signal-emitting object.

The method may also comprise a step of determining a distance or position 46 of the signal emitting object. This step may be preceded by a step for collecting data 45 for the distance/position determination. In one example, the collected data for the distance/position determination includes determined directions originating from a plurality of direction determinations. The processing unit 35 may then in the distance/position determination step 46 be arranged to determine the distance to and/or a position of the signal-emitting object based on a direction difference between the different determined direction determinations. The determination of the distance to the signal-emitting object may in one example be based on trigonometry caused by a travelling movement of the platform. This is for example illustrated in FIG. 2 a. The result 47 of the determined distance and/or position may be presented by the display unit 37.

In FIG. 2b, an example is illustrated wherein the collection 45 of data for distance/position determination involves collecting data related height of the platform in the form of an airborne vehicle and the direction to the land based signal emitting object. The distance 46 to the signal-emitting object is then determined based on the direction to the landbased signal emitting object and based on the height of the airborne platform.

In FIG. 2c an example is illustrated, wherein the collection 45 of data for distance/position determination involves collecting data related to the direction to the signal emitting object from a plurality of spaced apart platforms. The distance 46 to said signal-emitting object is then determined based on the collected directions from the different platforms using a cross bearing technique, wherein the geographical positions of the different platforms is known.

The method can be stopped for several reasons. One possibility is that the direction to/distance to/position of the signal-emitting object has been determined with high accuracy. Another possibility is that the platform gets an instruction which is not compatible with continuing the direction finding. A further possibility is that the signal(s) with the interesting frequency content is lost.

The invention is not limited to the specific flowchart presented, but includes all variations within the scope of the present claims. The internal sequence of the steps for arriving at determining direction to a signal-emitting object based on the phase relation between signals received at different points in time can of course be varied according to the demands of flight direction, pulses of received signals, speed of turning the platform, time of measurement etc.

As will be realised, the invention is capable of modification in various obvious respects, all without departing from the scope of the appended claims. Accordingly, the drawings and the description thereto are to be regarded as illustrative in nature, and not restrictive.

The invention claimed is:

1. A computer-implemented method for determining a direction (44) to a signal-emitting object via a platform comprising at least two antennas separated by a known distance, said method comprising the steps of:
   (a) receiving, with each of said at least two antennas (31, 32), one or more signals from said signal-emitting object at first positions (41a);
   (b) automatically determining, via at least one processing unit, a first phase relation of said one or more signals between said at least two antennas (31, 32);
   (c) receiving, with each of said at least two antennas (31, 32), one or more signals from said signal-emitting object at at least second positions (41b);
   (d) automatically determining, via the at least one processing unit, at least a second phase relation of said one or more signals between said at least two antennas (31, 32);
   (e) automatically detecting, via the at least one processing unit and a position determination unit, a change in orientation of said platform;
   (f) automatically determining, via the at least one processing unit, one or more corresponding changes in one or more positions (43) of each of said at least two antennas (31, 32) of said at least two antennas (31, 32), said one or more corresponding changes in said one or more positions (43) of each of said at least two antennas (31, 32) is based on said detected change in orientation of said platform; and
   (g) automatically, determining, via the at least one processing unit, a direction (44) to said signal-emitting object based on said first phase relation, said at least second phase relation, and said one or more changes in said one or more positions (43) of each of said at least two antennas (31, 32),
   wherein:
      said at least two antennas (31, 32) define a long base interferometer (LBI);
      said at least two antennas (31, 32) are mounted on said platform (30);
      said platform (30) is an airborne vehicle;
      said change in orientation of said platform (30) is at least one of a roll or a turn of said airborne vehicle;
      said at least one of a roll or a turn occurs in a direction perpendicular to a travelling movement of said airborne vehicle; and
      said method further comprises the step of repeating said steps (a)-(g) at least until ambiguities have been resolved with a desired degree of accuracy.

2. Method according to claim 1, wherein the reception of the first and the at least second signal are taken into account only when a main lobe of the antenna radiation pattern from the signal-emitting object is facing said platform.

3. Method according to claim 1, wherein the determination of said direction (44) to said signal-emitting object is based on virtual antenna array aperture formed by said one or more changes in said one or more positions (43) of said at least one antenna (31).

4. Method according to claim 1, further comprising the step of determining a distance (46) to said signal-emitting object based on variations in determined directions to said signal-emitting object over a period of time.

5. Method according to claim 1, further comprising the step of determining a distance (46) to said signal-emitting object based on the direction to a land-based signal emitting object and on the height of an airborne platform.

6. Method according to claim 1, further comprising the step of determining a distance (46) to said signal-emitting object based on determined directions from at least two platforms with different geographical positions using a cross bearing technique.

* * * * *